(No Model.)
W. P. MILLER.
LUBRICATOR.
No. 367,311. Patented July 26, 1887.
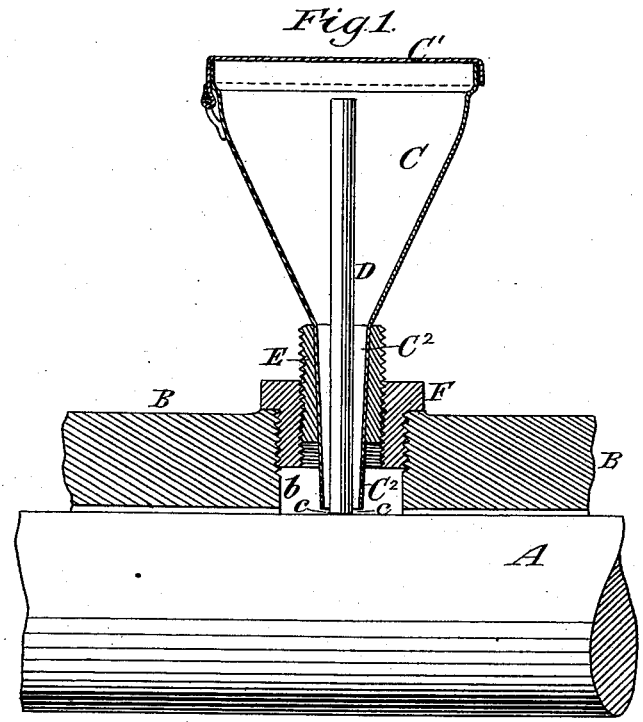
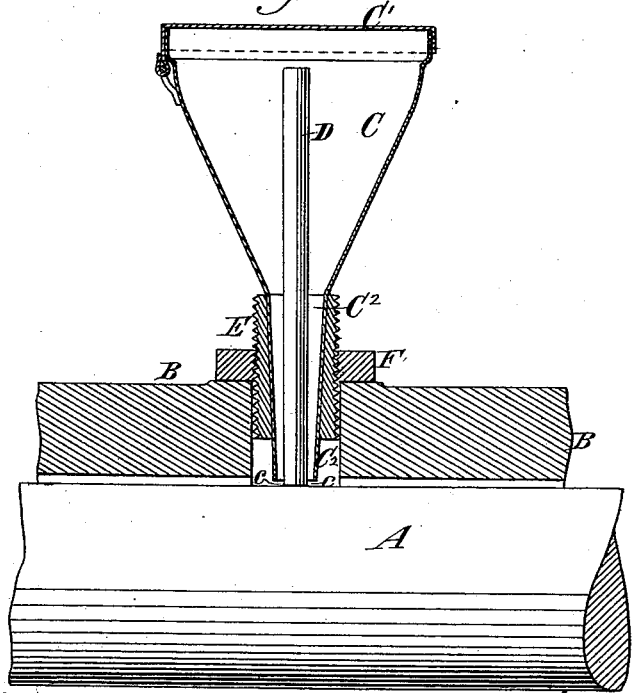
Witnesses:
@ Sundgren
Emil Heuter
Inventor
William P. Miller
by his attys
Brown & Hall

UNITED STATES PATENT OFFICE.

WILLIAM P. MILLER, OF BROOKLYN, NEW YORK, ASSIGNOR TO THE WILLIAM P. MILLER COMPANY, OF SAME PLACE.

LUBRICATOR.

SPECIFICATION forming part of Letters Patent No. 367,311, dated July 26, 1887.

Application filed April 22, 1887. Serial No. 235,731. (No model.)

*To all whom it may concern:*

Be it known that I, WILLIAM P. MILLER, of Brooklyn, (Green Point,) in the county of Kings and State of New York, have invented a new and useful Improvement in Lubricators, of which the following is a specification.

The invention relates more particularly to lubricators or grease-cups for solid or semi-fluid lubricating compounds, and is applicable to such cups, whether the feeding is accomplished by heat obtained by a copper rod or spindle, by vibration of a rod or spindle, or by pressure due to a weight or spring.

The object of the invention is to provide, in a very simple manner, for regulating the feeding of grease from the cup; and the invention consists in the combination, with a shaft or pin and a bearing or box to which it is fitted, of a grease-cup and a support therefor, through which the outlet-tube of the cup extends into close proximity to the shaft or pin, and which is adjustable in the bearing or box, to increase or diminish the lateral space between the end of the outlet-tube and the shaft or pin, and thereby increase or diminish the flow of grease from the cup. With such a combination, the flow of grease from the cup is controlled solely by varying the extent of lateral space afforded between the extreme end of the outlet-tube and the periphery of the shaft or pin, or other journal to which the cup is applied, and the support for the cup may advantageously consist of an externally-threaded bushing, through which the outlet-tube extends, and a nut supported by the bearing or box, and to which the bushing is fitted.

In the accompanying drawings, Figures 1 and 2 represent a portion of a shaft and a sectional elevation of the upper part of a bearing or box, and a grease-cup embodying my invention applied thereto.

The two figures represent two examples of my invention, differing but slightly from each other, and in both of them similar letters of reference designate corresponding parts.

A designates a shaft, journal, or a pin—such as a crank-pin—which is fitted to a bearing or box, B, of which I have only shown the upper portion.

C designates the lubricator or grease-cup, which, as here represented, has a hinged cover, C', and an outlet-tube, $C^2$. Within this cup I have shown as arranged a pin or spindle, D, which may be of copper, and which bears with its lower end upon the surface of the shaft or journal A.

According to my invention I control the flow of grease or lubricant from the cup solely by the extent of lateral space, c, afforded between the extremity of the outlet-tube $C^2$ and the surface of the shaft A. When the cup is raised so as to increase this space, the flow of grease from the cup will be correspondingly increased, and when the cup is lowered so as to diminish the extent of this space the flow of grease will be diminished. To accomplish this result I provide for the cup C an adjustable support, E, which, as here represented, consists of an externally-threaded bushing screwed into a nut, F, which is supported by the bearing B. In Fig. 1 I have represented a nut, F, which is screwed into an aperture, b, in the bearing, and in Fig. 2 I have represented a nut, F, which rests simply upon the top of the bearing. The bushing E surrounds the outlet-tube $C^2$ of the cup, and the latter may be secured therein by solder or by being tightly fitted thereto.

The bushing E may be fitted to the nut so that it may be turned therein by the fingers, and when it is desired to vary the extent of the lateral space c, all that is necessary is to turn the bushing in a direction to raise or lower the cup to the desired degree.

It will be seen that the means which I employ for controlling the flow of grease from the cup are extremely simple, and consequently the cup can be made and sold at a very low price.

What I claim as my invention, and desire to secure by Letters Patent, is—

1. The combination, with a shaft or pin and a bearing or box to which it is fitted, of a grease-cup and a support therefor, through which the outlet-tube of the cup extends into close proximity to the shaft or pin, and which is adjustable in the bearing or box, to increase or diminish the lateral space between the end of the outlet-tube and the shaft or pin, and thereby to increase or diminish the flow of grease from the cup, substantially as herein described.

2. The shaft or pin A, the bearing or box B, the grease-cup C, having the outlet-tube $C^2$, the externally-threaded bushing E, through which the outlet-tube extends, and a nut, F, supported by the bearing or box and to which the bushing is fitted, said parts being combined substantially as herein described, whereby the end of the outlet-tube $C^2$ may be brought into close proximity to the shaft or pin, or raised to increase the lateral opening afforded between the end of said tube and the periphery of the shaft or pin.

WM. P. MILLER.

Witnesses:
FREDK. HAYNES,
HENRY J. MCBRIDE.